UNITED STATES PATENT OFFICE.

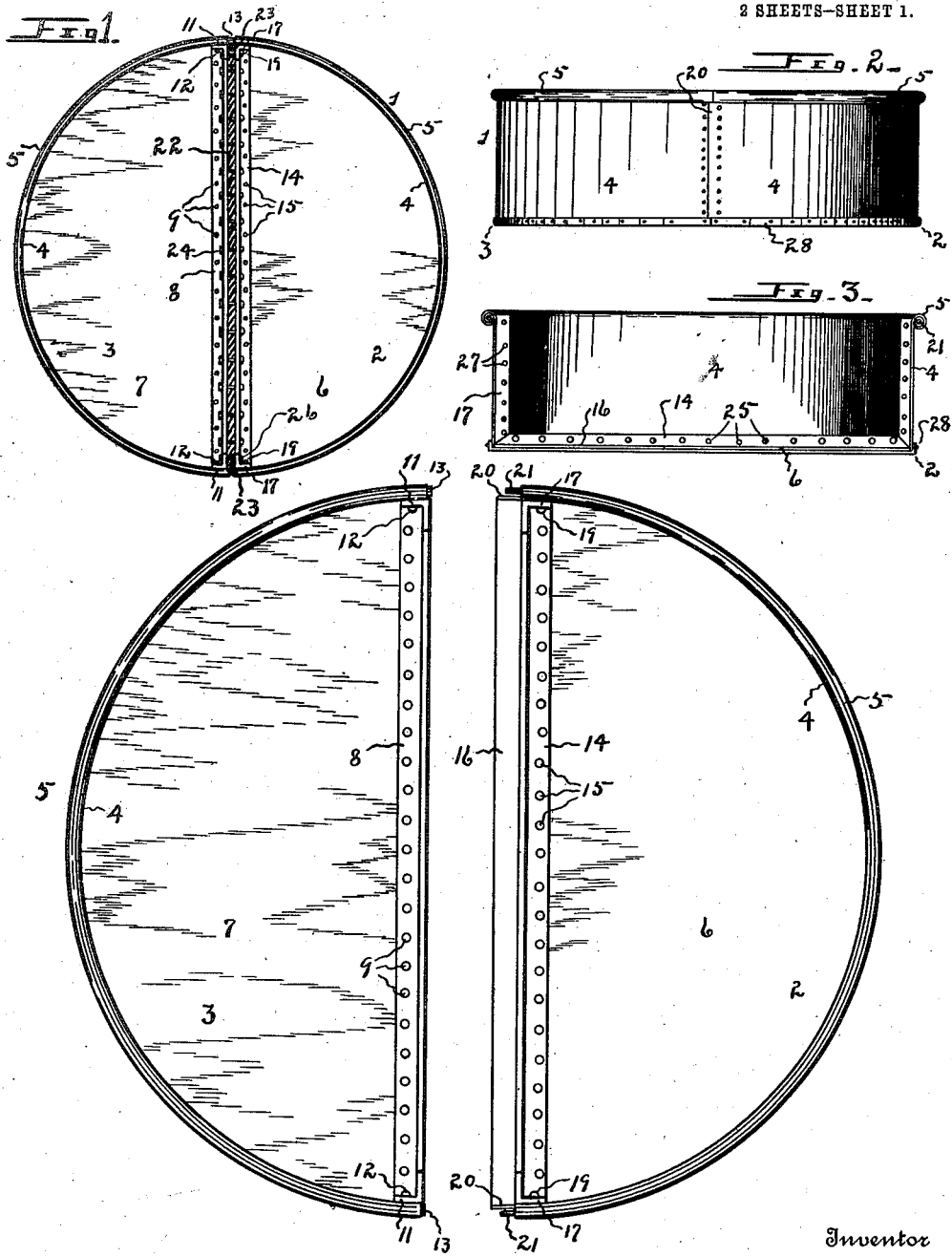

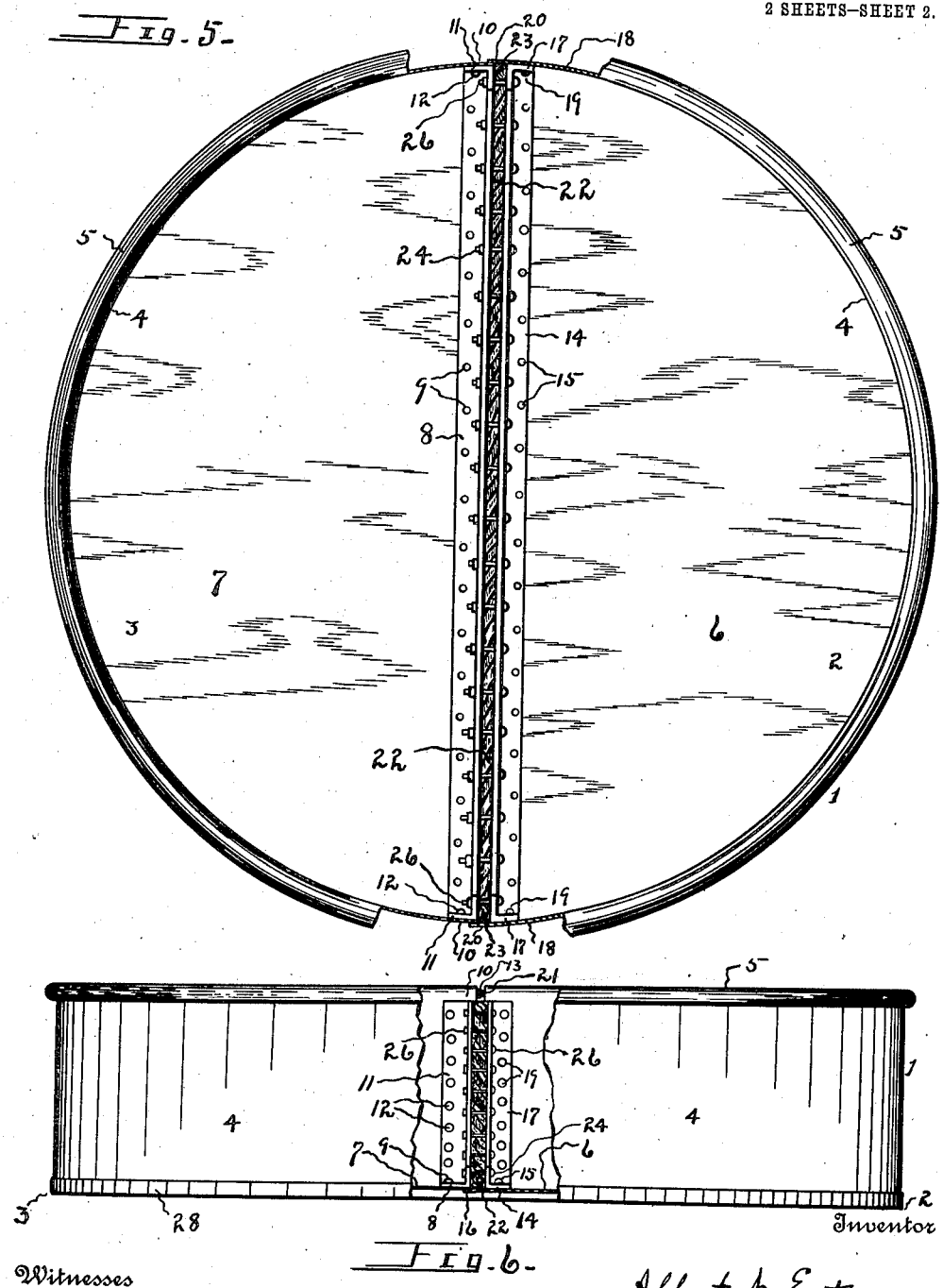

ALBERT N. EATON, OF OMAHA, NEBRASKA.

SECTIONIZED TANK.

1,029,745.  Specification of Letters Patent.  Patented June 18, 1912.

Application filed April 3, 1911. Serial No. 618,660.

*To all whom it may concern:*

Be it known that I, ALBERT N. EATON, a citizen of the United States, residing at Omaha, in the county of Douglas and State of Nebraska, have invented certain new and useful Improvements in Sectionized Tanks, of which the following is a specification.

This invention relates to improvements in that class of metallic, upright, cylindrical tanks used for watering stock, wherein each tank consists of two equal parts, or is bisected, so that the tanks may be disposed to occupy a limited space when shipped, the two halves of each tank being secured together after the shipment has been made.

The invention has for its principal object to provide a convenient and economical means for connecting the two halves of the tank, and consists of the novel construction, combination and arrangement of parts as described herein and claimed, and as illustrated in the drawing, wherein,—

Figure 1 is a plan view of the tank. Fig. 2 is a vertical side view of the same. Fig. 3 is a view showing the inner side of one of the complete half-portions of the tank. Fig. 4 is an enlarged plan view, showing the two halves of the tank when separated. Fig. 5 is an enlarged plan view of the tank when connected, parts of the rolls being broken away, and parts of the upright walls being shown in section. Fig. 6 is a vertical side view of the tank, the upright wall of each half of the tank at one of its terminals being broken away, and parts of the bottoms being in section.

Referring now to the drawing for a more particular description, numeral 1 indicates a two-part watering tank of cylindrical form, which may be constructed to advantage of sheet metal, and consisting of two half-portions indicated at 2 and 3, each having upon the upper terminal of its upright wall 4, a roll 5, the bottoms of portions 2 and 3 being respectively indicated at 6 and 7.

Upon the inner surface of bottom 7 is disposed the rigid bar or angle iron 8, the same having a length substantially equal to the diameter of the tank and the horizontal flange of angle iron 8 is secured to bottom 7 by numerous rivets 9. Upon the inner surface and at the terminals 10 of the upright wall of portion 3 of the tank, are indicated rigid bars or angle irons 11. One of the flanges of each of angle irons 11 is secured to a terminal 10 by numerous rivets 12, the other flanges of angle irons 11 are disposed substantially in alinement with the vertical flange of angle iron 8, and within the roll at the upper part of portion 3 may be mounted the curved pipe 13, to reinforce said roll.

As thus described a complete one-half of the tank is provided, the inner straight edge of bottom 7 being substantially flush with the upright flange of angle iron 8, the vertical edges of the upright wall being disposed substantially flush with the apex of each vertical angle iron 11; and soldering (not shown) is employed in addition to the use of rivets 9 and 12, and is applied between angle irons 8 and 11 and the respective bottom and side walls of the tank, so that water cannot pass therebetween.

At 14 is indicated a rigid bar or angle iron, its horizontal flange being disposed upon the inner surface of and secured to bottom 6 by use of numerous rivets 15, its vertical flange being disposed substantially parallel with and adjacent to the terminal straight edge of said bottom to provide, outwardly of said vertical flange, the longitudinal horizontal ledge or shelf 16.

At 17 are indicated vertical rigid bars or angle irons, and one of the flanges of each may bear upon the inner surface of the terminal portion 18 of the upright wall of portion 2, the other flanges of said angle irons being disposed in alinement with the vertical flange of angle iron 14, and numerous rivets 19 may be employed for securing said angle irons to said upright wall. Soldering (not shown) is also applied between the angle irons and the respective bottom and side wall to prevent the passage of water therebetween. The upright wall of portion 2 has a length or area sufficient to extend outwardy of angle irons 17 to provide terminal portions or vertical ledges 20.

At 21 are indicated the terminals of a curved bar or pipe, said pipe being disposed within roll 5 of portion 2, and terminals 21 may be inserted within the terminals of pipe 13 for the purpose of reinforcing the rolls, after the two halves of the tank have been connected.

At 22 is indicated a flexible filler-strip, preferably of asbestos, having a length substantially equal to that of angle irons 8 and 14, and when connecting the two halves of the tank it may be placed upon the horizontal ledge 16.

At 23 are indicated strips of asbestos or similar material, which may be disposed vertically upon ledges 20 of the upright wall of portion 2 of the tank. When connecting the two halves of the tank, portion 3 is disposed with its angle iron 8 substantially parallel with angle iron 14, its bottom 7 near its inner edge being disposed upon ledge 16, the edges of its upright wall being disposed inwardly of upright ledges 20 of part 2 of the tank. By use of numerous screw-bolts 24 seated in apertures 25 of angle irons 8 and 14, said angle irons may be moved toward each other and the filler strip 22 may be compressed therebetween. By use of numerous keepers or screw-bolts 26 inserted in apertures 27 of angle irons 17, the filler strips 23 may likewise be compressed, the compression of these filler strips being the last part of the operation of connecting the two halves of the tank, and preventing the passage of water between the adjacent angle irons.

In practice, filler strips 22 and 23 may, of course, consist of a single strip; and short strips may be used, if desired, it only being necessary that the intervening spaces between the angle irons upon the bottom and side walls be filled with some strong, impervious, resisting substance which, when compressed, will prevent the escape of water between the angle irons.

Ledges 16 and 20 which project outwardly of angle irons 14 and 17 operate to advantage, for the reason that the filler strips are disposed outwardly of bolts 24 and 26, and the ledges provide a housing to retain the filler strips when connecting the two halves of the tank, and they provide outer coverings to protect the filler after the connection has been made.

At 28 are indicated curved angle irons which bear upon and are secured to the lower peripheral edge of each half of the tank.

While I have shown and described a bisected, cylindrical tank, it is obvious that the means for connecting the edges of the two parts as herein outlined could be used for two-part rectangular tanks or receptacles generally which have bottoms and upright sides.

In the manufacture of watering tanks the only object of furnishing them to the trade in a two-part condition or cut into halves, is to decrease the cost of shipments. The difference in the cost of the two-part tank has resulted in their quite general use.

The herein described means for connecting the parts is considered to be very simple and inexpensive, and the connection thus provided has been found to be reliable and durable in use.

Having fully described my invention, what I claim and desire to secure by Letters Patent is,—

1. A two part open top tank comprising a pair of semi-circular sections, a pair of L shaped angle bars, one of said bars extending across the bottom and up each side of each of the tank sections upon the inside thereof, one of the angular portions of each of said bars being fastened to its corresponding tank section, a packing between the other angular portions of said bars and means traversing said last named portions of said bars to draw them toward each other and to compress the packing between them, a roll rim around the upper edge of each of the tank sections, and reinforcing elements in said rim, the reinforcing element in the rim of one of the tank sections being adapted to enter the reinforcing element in the rim of the other tank section when said sections are drawn toward each other.

2. A two part open top tank comprising a pair of semi-circular sections, a pair of L shaped angle bars, one of said bars extending across the bottom and up each side of each of the tank sections, one of the angular portions of each of said bars being fastened to its corresponding tank section, a packing between the other angular portions of said bars and means traversing said last named portions of said bars to draw them toward each other and to compress the packing between them, a roll rim around the upper edge of each of the tank sections, and reinforcing elements in said rim, the reinforcing element in the rim of one of the tank sections being adapted to enter the reinforcing element in the rim of the other tank section when said sections are drawn toward each other, and the bottom and sides of one of the tank sections being extended beyond its L shaped bar to cause it to overlap the bottom and sides of the other tank section when the tank sections are drawn toward each other.

In testimony whereof I have affixed my signature in presence of two witnesses.

ALBERT N. EATON.

Witnesses:
HIRAM A. STURGES,
E. L. HUMPHREY.